US010681173B2

(12) United States Patent
Sofia et al.

(10) Patent No.: US 10,681,173 B2
(45) Date of Patent: Jun. 9, 2020

(54) OPTIMIZED NETWORK TRAFFIC PATTERNS FOR CO-LOCATED HETEROGENEOUS NETWORK ATTACHED ACCELERATORS

(71) Applicant: International Business Machines Corporation, Armonk, NY (US)

(72) Inventors: Anthony T. Sofia, Hopewell Junction, NY (US); Nicholas P. Sardino, Hyde Park, NY (US)

(73) Assignee: International Business Machines Corporation, Armonk, NY (US)

( * ) Notice: Subject to any disclaimer, the term of this patent is extended or adjusted under 35 U.S.C. 154(b) by 38 days.

(21) Appl. No.: 15/943,760

(22) Filed: Apr. 3, 2018

(65) Prior Publication Data
US 2019/0306269 A1    Oct. 3, 2019

(51) Int. Cl.
*H04L 29/08* (2006.01)
*G06F 16/2453* (2019.01)
*G06N 20/00* (2019.01)

(52) U.S. Cl.
CPC .......... *H04L 67/32* (2013.01); *G06F 16/2453* (2019.01); *H04L 67/02* (2013.01); *H04L 67/16* (2013.01); *G06N 20/00* (2019.01)

(58) Field of Classification Search
USPC ....................................................... 709/201
See application file for complete search history.

(56) References Cited

U.S. PATENT DOCUMENTS

| 7,219,085 | B2 | 5/2007 | Buck et al. |
| 7,908,259 | B2 | 3/2011 | Branscome et al. |
| 8,359,281 | B2 | 1/2013 | Cadambi et al. |
| 2004/0042487 | A1* | 3/2004 | Ossman ................. H04L 29/06 370/466 |
| 2010/0228819 | A1* | 9/2010 | Wei ......................... G06F 9/505 709/203 |
| 2010/0329117 | A1* | 12/2010 | Lee ..................... H04B 7/18586 370/235 |
| 2017/0083827 | A1* | 3/2017 | Robatmili .............. G06N 20/00 |
| 2018/0365272 | A1* | 12/2018 | Sastry ................. G06F 16/2455 |

OTHER PUBLICATIONS

Sukhwani et al., "Database Analytics Acceleration using FPGAs", PACT'12, Sep. 19-23, 2012, Minneapolis, Minnesota, USA. Copyright 2012 ACM 978-1-4503-1182—Mar. 12, 2009, 10 pages.
Weerasinghe et al., "Network-Attached FPGAs for Data Center Applications", 978-1-5090-5602-6/16, © 2016 IEEE, 8 pages.
Woods et al., "Ibex—An Intelligent Storage Engine with Support for Advanced SQL Offloading", Proceedings of the VLDB Endowment, vol. 7, No. 11, Copyright 2014 VLDB Endowment 21508097/14/07, 12 pages.

* cited by examiner

*Primary Examiner* — Hermon Asres
(74) *Attorney, Agent, or Firm* — Monchai Chuaychoo

(57) ABSTRACT

An approach for optimizing the use of accelerators. The approach includes receiving a job request from an application. Furthermore, a network mapping is created of one or more accelerators associated with the job request based on a utilization component. The network mapping is sent to the application to utilize the one or more identified accelerators directly by the application.

16 Claims, 5 Drawing Sheets

OPTIMIZED NETWORK TRAFFIC PATTERNS FOR CO-LOCATED HETEROGENEOUS NETWORK ATTACHED ACCELERATORS

BACKGROUND OF THE INVENTION

The present invention relates generally to the field of computer software and more particularly to accelerator technology.

As the need for computing performance continues to force workload specific acceleration technology, there will be all sorts of different form-factors for accelerators. In many cases it will be advantageous to build an entire special purpose machine to perform acceleration and provide access to it through standard network attachments, such as Ethernet. In order to maintain order with the accelerator it will likely be designed so that the network attached accelerators are on a private network with the host system(s) that are using the accelerator.

Furthermore, as the set of accelerator technology grows; there will be a heterogeneous set of functions available to be accelerated. For example, there could be a data pipeline that involves multiple acceleration technologies. In addition, those pipelines with the data would flow from the host, to an accelerator, back through the host and then to a second accelerator. This would cause added latency as each trip through the host (i.e., would require memory access, moving the data through the CPU (Computer Processing Unit) caches and back out through another network interface).

Therefore, realizing an efficient system for utilizing one or more accelerator has a broad and fundamental interest in computing technologies.

SUMMARY

Embodiments of the present invention disclose a method, a computer program product, and a system for optimizing the use of accelerators. The method may include one or more computer processors receiving a job request from an application; creating a network mapping of one or more accelerators associated with the job request based on a utilization component; and sending the network mapping to the application to utilize the one or more identified accelerators directly by the application.

According to another embodiment, the computer program product for optimizing the use of accelerators, the computer program product comprising: one or more computer readable storage devices and program instructions stored on the one or more computer readable storage devices, the stored program instructions comprising: program instructions to receive a job request from an application; program instructions to create a network mapping of one or more accelerators associated with the job request based on a utilization component; and program instructions to send the network mapping to the application to utilize the one or more identified accelerators directly by the application.

According to another embodiment, the computer system for optimizing the use of accelerators, the computer system comprising: one or more computer processors; one or more computer readable storage devices; program instructions stored on the one or more computer readable storage devices for execution by at least one of the one or more computer processors, the stored program instructions comprising: program instructions to receive a job request from an application; program instructions to create a network mapping of one or more accelerators associated with the job request based on a utilization component; and program instructions to send the network mapping to the application to utilize the one or more identified accelerators directly by the application.

DETAILED DESCRIPTION

Figure 1A:
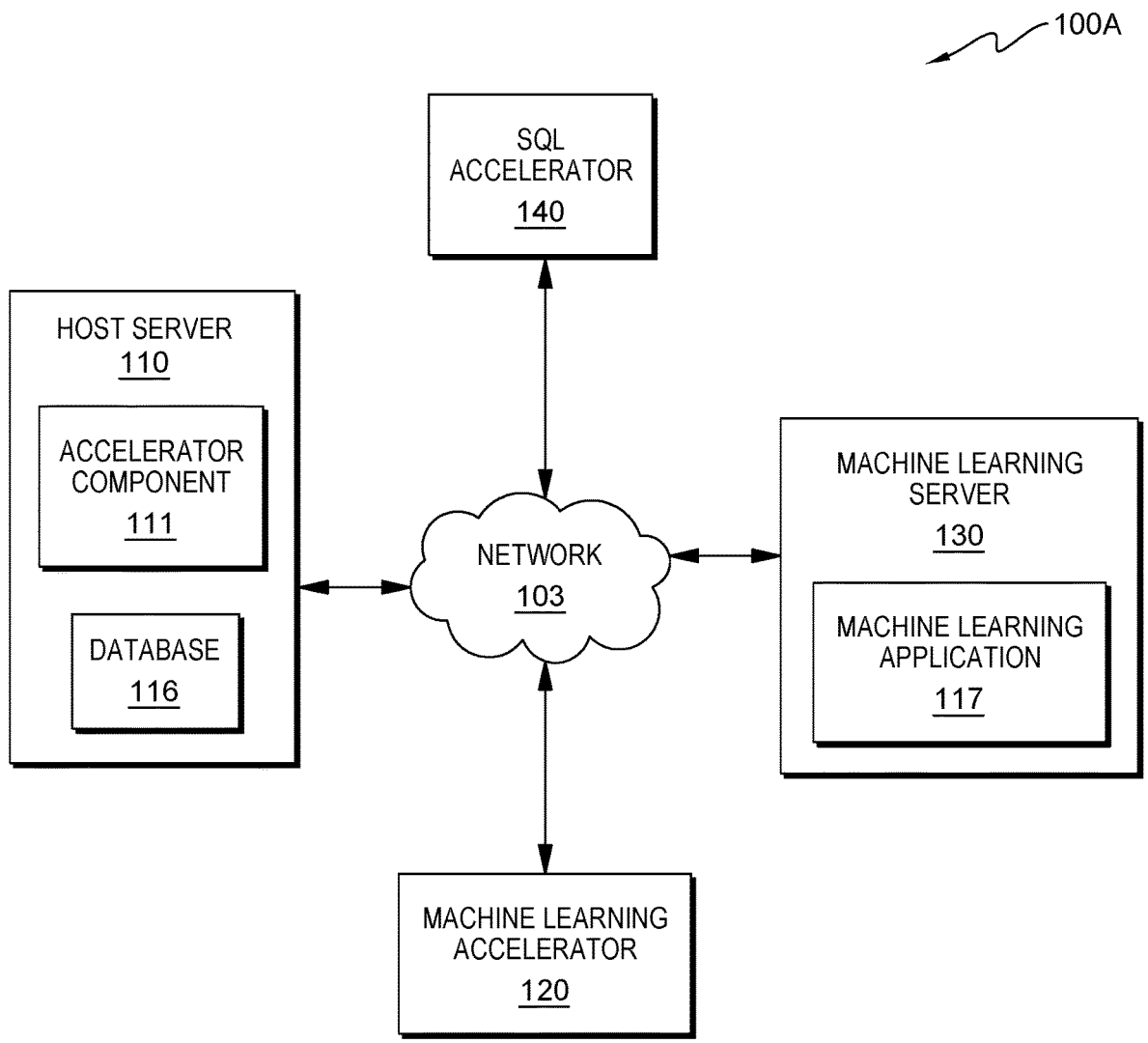
FIG. 1A is a functional block diagram illustrating the topology of the host server accelerator environment 100A, in accordance with an embodiment of the present invention.

Embodiments of the present invention recognize that improvements to one or more servers can be optimized by using one or more attached accelerators.

One embodiment of the present invention provides a method for a heterogeneous set of acceleration technology to provide closer interaction of requests and responses. This feature can significantly reduce the overhead of building data pipelines that leverage several different acceleration technologies.

Another embodiment of the present invention provides a method for building pipelines of acceleration technologies. The specific use-case here is for using database acceleration to build feature sets for a machine learning or deep learning accelerator. However, it can be used with other use-case such as database and network requests.

Accelerators are specialized devices that provides closer interaction of request and responses. Accelerators can include a database accelerator, a machine learning accelerator, and web service accelerator.

Generally, a database acceleration/accelerator is a network attached device that maintains column-store versions of database tables, in-memory, that provide large performance improvements for SQL (Structured Query Language) queries that perform, for instance, many table joins. This type of accelerator would typically be hidden behind a database system. For instance, DB2®, a database product that runs on z/OS®, would maintain connectivity to the accelerator and route queries to it. This means that any access to the accelerator would need to go through the z/OS® host system. It is noted that DB2® and z/OS® are used in the preceding example but other flavor of databases (e.g., relational, NoSQL, etc.) and OS servers (e.g., Windows®, Linux®, etc.) can be utilized as well.

In a specific use-case associated with machine learning request, the basic fundamental process requires a set of observations, each of which is a set of features. This data can be sourced from a database system, like DB2®, and would be the result of multiple table joins. The query that would provide the input to machine learning, may be subject for acceleration. In the machine learning example, a user would request a machine learning job to the host server (e.g., z/OS® system). The host server would then send a request over the network to the accelerator. As part of this machine learning job, the host server would need to submit SQL in order obtain the training observations. This invention can add a detection mechanism, in this case specific for SQL and ML (machine learning) accelerators, but it could be generalized for other workflows that leverage other accelerators. In this case both accelerators are on the same private network with the host that is responsible for routing work to the accelerators. The machine learning application already understands how to offload work to the machine learning accelerator, however it does not have any inherit knowledge of the availability of an SQL accelerator.

Detailed description of embodiments of the claimed structures and methods are disclosed herein; however, it is to be understood that the disclosed embodiments are merely illustrative of the claimed structures and methods that may be embodied in various forms. In addition, each of the examples given in connection with the various embodiments is intended to be illustrative, and not restrictive. Further, the figures are not necessarily to scale, some features may be exaggerated to show details of particular components. Therefore, specific structural and functional details disclosed herein are not to be interpreted as limiting, but merely as a representative basis for teaching one skilled in the art to variously employ the methods and structures of the present disclosure.

References in the specification to "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments, whether or not explicitly described.

FIG. 1A is a functional block diagram illustrating a host server accelerator environment, generally designated 100A, in accordance with one embodiment of the present invention. FIG. 1A provides only an illustration of one implementation and does not imply any limitations with regard to the environments in which different embodiments may be implemented. Many modifications to the depicted environment may be made by those skilled in the art without departing from the scope of the invention as recited by the claims.

Host server accelerator environment 100A includes host server 110, machine learning accelerator (ML) 120, machine learning server 130, and SQL (Structured Query Language) accelerator 140, all interconnected over network 103. Network 103 can be, for example, a telecommunications network, a local area network (LAN), a wide area network (WAN), such as the Internet, or a combination of the three, and can include wired, wireless, or fiber optic connections. Network 103 can include one or more wired and/or wireless networks that are capable of receiving and transmitting data, voice, and/or video signals, including multimedia signals that include voice, data, and video information. In general, network 103 can be any combination of connections and protocols that can support communications between host server 110, machine learning accelerator 120, machine learning server 130, SQL accelerator 140, and other computing devices (not shown) within host server accelerator environment 100A.

Host server 110 can be a standalone computing device, a management server, a web server, a mobile computing device, or any other electronic device or computing system capable of receiving, sending, and processing data. In other embodiments, host server 110 can represent a server computing system utilizing multiple computers as a server system, such as in a cloud computing environment. In another embodiment, host server 110 can be a laptop computer, a tablet computer, a netbook computer, a personal computer (PC), a desktop computer, a personal digital assistant (PDA), a smart phone, or any other programmable electronic device capable of communicating with machine learning accelerator 120, and other computing devices (not shown) within host server accelerator environment 100A via network 103. In another embodiment, host server 110 represents a computing system utilizing clustered computers and components (e.g., database server computers, application server computers, etc.) that act as a single pool of seamless resources when accessed within host server accelerator environment 100A. Host server 110 includes accelerator component 111, database 116, and optionally (although not shown in FIG. 1A) machine learning application 117.

Accelerator component 111 enables the present invention to manage one or more accelerators and various applications requesting those accelerators. For example, referring to FIG. 1A, accelerator component 111 manages machine learning accelerator 120. In the depicted embodiment, accelerator component 111 resides on host server 110. In another embodiment, accelerator component 111 can reside on machine learning accelerator 120, machine learning server 130, or SQL accelerator 140. In the depicted embodiment, accelerator component 111 consists of several components (refer to FIG. 2) such as detection component 112 and utilization component 114.

Database 116 is a repository for data used by accelerator component 111. In the depicted embodiment, database 116 resides on host server 110. In another embodiment, database 116 may reside elsewhere within host server accelerator environment 100A (or 100B), provided that accelerator component 111 has access to database 116. A database is an organized collection of data. Database 116 can be implemented with any type of storage device capable of storing data and configuration files that can be accessed and utilized by host server 110, such as a database server, a hard disk drive, or a flash memory. Database 116 uses one or more of a plurality of techniques known in the art to store a plurality of information. For example, database 116 may store information that is used by machine learning application 117 or machine learning server 130 to perform a certain task.

Machine learning application 117 is a program that allows users or machines to "learn" with data without being explicitly programmed. However, machine learning applications are well known in the art and can include algorithms such as decision tree learning, associate rule learning, or deep learning. In the current embodiment, machine learning application 117 resides on machine learning server 130. In another embodiment, machine learning application 117 may reside on host server 110 as noted above.

Machine learning accelerator 120 is one or more specialized devices (i.e., specialized calculating hardware) that are capable of improving efficiency and processing of machine learning applications.

Machine learning server 130 contains instructions that manages machine learning for the user or other devices. Machine learning server 130 can be a standalone computing device, a management server, a web server, a mobile computing device, or any other electronic device or computing system capable of receiving, sending, and processing data. In other embodiments, machine learning server 130 can represent a server computing system utilizing multiple computers as a server system, such as in a cloud computing environment. In another embodiment, host server 110 can be a laptop computer, a tablet computer, a netbook computer, a personal computer (PC), a desktop computer, a personal digital assistant (PDA), a smart phone, or any other programmable electronic device capable of communicating with machine learning accelerator 120, and other computing devices (not shown) within host server accelerator environment 100A via network 103. In another embodiment, machine learning server 130 represents a computing system utilizing clustered computers and components (e.g., database server computers, application server computers, etc.) that act as a single pool of seamless resources when accessed within host server accelerator environment 100.

SQL accelerator 140 is one or more specialized devices (i.e., specialized calculating hardware) that are capable of improving efficiency and processing of database search and retrieval requests.

Figure 1B:
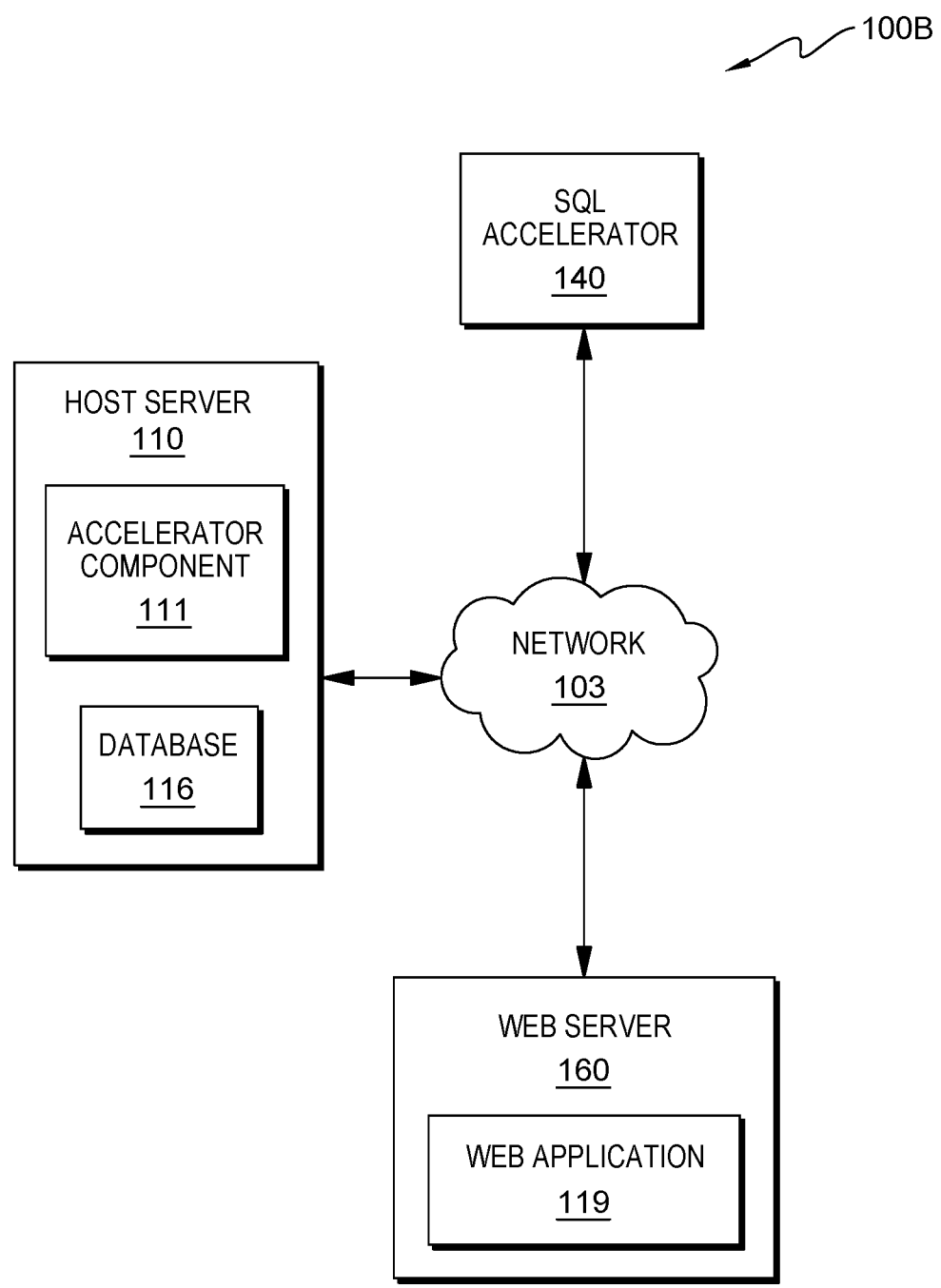
FIG. 1B is a functional block diagram illustrating of the topology of the host server accelerator environment 100B with a web server, in accordance with an alternate embodiment of the present invention.

FIG. 1B is a functional block diagram illustrating a host server accelerator environment 100B with a web server in accordance with an alternate embodiment of the present invention. FIG. 1B closely mirrors FIG. 1A with a few exceptions. For example, FIG. 1B does not contain machine learning accelerator 120 or machine learning server 130 but contains web server 160. Furthermore, FIG. 1B does not contain machine learning application 117 but instead web application 119.

In this alternate embodiment, host server 110 includes accelerator component 111, database 116, and optionally (although not shown in FIG. 1B) web application 119.

Web application 119 is a client-server computer program in which the client runs in a web browser. For example, web application 119 can include webmail, social media sites and online retail sales. In the current embodiment, web application 119 resides on web server 160. In another embodiment, web application 119 may reside on host server 110 as noted above.

Web server 160 is a server that hosts and manages various web utilities. For example, web server 160 can host social media content for users. Web server 160 can be a standalone computing device, a management server, a web server, a mobile computing device, or any other electronic device or computing system capable of receiving, sending, and processing data. In other embodiments, web server 160 can represent a server computing system utilizing multiple computers as a server system, such as in a cloud computing environment.

Figure 2:
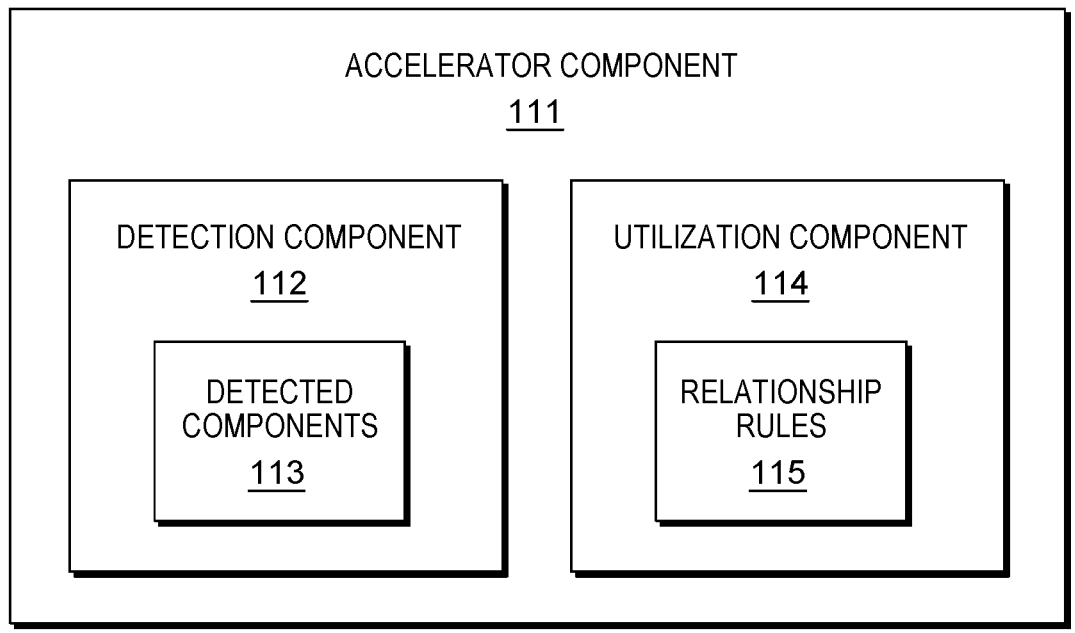
FIG. 2 is a functional block diagram illustrating the components of accelerator component 111, in accordance with an embodiment of the present invention.

FIG. 2 is a functional block diagram illustrating the components of accelerator component 111, in accordance with an embodiment of the present invention. Accelerator component 111 includes detection component 112 and utilization component 114.

Detection component 112 of the present invention provides the capability of discerning accelerators attached on the network. Additionally, detection component 112 includes detected components 113. In an embodiment, detection component 112 can recognize and differentiate various types of accelerators attached on the network. For example, (referring to FIG. 1A), detection component 112 is able to determine that there are two accelerators attached to network 103: machine learning accelerator 120 and SQL accelerator 140. Detected components 113 provide the capability of detection component 112 to keep track of available accelerators, network topography, and other parameters. Detected components 113 utilize a storage table (e.g., database 116, etc.) to keep information such as the network connection information for the accelerator.

In another embodiment, detection component 112 can send out a broadcast message over network 103 and wait for a response from the attached accelerators. For example, accelerators can have a broadcast component associated with them that will listen in on a given TCP/IP (Transmission Control Protocol/Internet Protocol) port to which detection component 112 broadcasts. In yet another embodiment, detection component 112 receives a message directly from the attached accelerators. For example, attached accelerators can register with detection component 112 directly without waiting for a broadcast message from host server.

Utilization component 114 of the present invention provides the capability to discern job requests from the user and determines the best accelerator(s) to be used. Additionally, utilization component includes relationship rules 115. Relationship rules 115 provide either a pre-defined or used specified rules, to help guide decision making process for regarding how and what accelerators to use in certain situations. Relationship rules 115 can be dynamically changed by the user or can be pre-programmed before boot up. Utilization component 114 can create a network mapping based on relationship rules 115. It is noted that a network mapping may contain, but is not limited to, an IP (Internet Protocol) address, an SQL query instruction, IP port information and API code.

In an embodiment, utilization component 114 includes a calculating module that can determine a response time of a network route associated with each request using accelerators versus non-accelerator components. However, the calculating module still relies on relationship rules 115 in order to make decisions. For example, utilization component 114 may calculate a network route based on the attached accelerators and calculate another route without the use of attached accelerators. Utilization component 114 may compare the response time of each route (e.g., non-accelerated versus accelerated) to determine the optimal route for the specific job request. If the accelerated components are used, utilization component 114 can create a network mapping. However, if no accelerated components, utilization component 114 will not create a network mapping and will allow the requesting application to utilized non-accelerated components. It is further noted that "response time" may include but is not limited, a network latency time, a database query time, and application response time.

In another embodiment, utilization component 114 determines the request is from (referring to FIG. 1A) machine learning application 117 and using relationship rules 115, utilization component 114 decides to provide the machine learning application with the network connection information for the SQL accelerator 140 in order to provide the most efficient means of fulfilling the request. Therefore, utilization component 114 creates a network mapping, for the requesting application to access SQL accelerator 140. For example, if a network mapping is created by utilization component 114 then it may contain network routes for the requesting application to connect and use the available accelerators.

Figure 3:
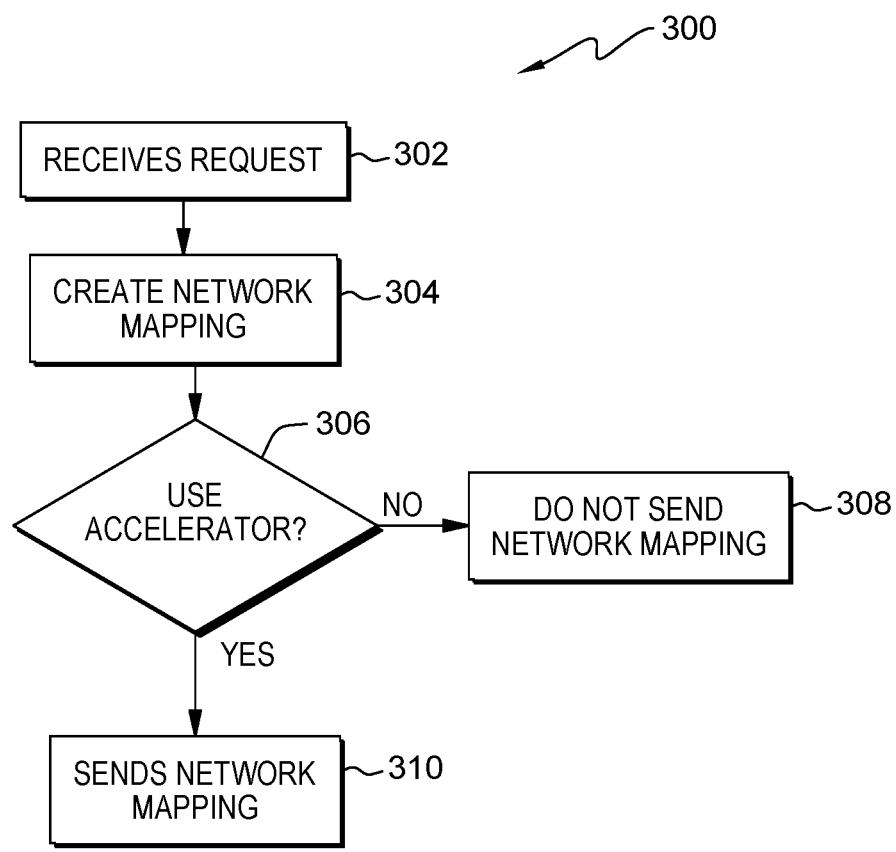
FIG. 3 is a flowchart, designated as 300, depicting operational steps of method for executing the host server accelerator environment 100A and 100B, in accordance with an embodiment of the present invention.

FIG. 3 is a flowchart, designated as 300, depicting operational steps of method for executing the host server accelerator environment, in accordance with an embodiment of the present invention.

Accelerator component 111 receives a request from an application (step 302). In an embodiment, accelerator component 111 receives a request from machine learning application 117 to access database 116. It is noted that accelerator component 111 through detection component 112 residing on host server 110 may already have detected active accelerators attached to network 103 during the boot up process. However, accelerator component 111 through detected components 113 may constantly query active accelerators on network 103 to make sure the list of accelerators is frequently updated. For example, (referring to FIG. 1A), accelerator component 111 detects SQL accelerator 140 and ML accelerator 120. Alternatively (referring to FIG. 1B), accelerator component 111 only detects SQL accelerator 140. In another embodiment, accelerator component 111 receives a request from web application 119 to access database 116.

Accelerator component 111 through utilization component 114 determines route(s) (step 304). After receiving information from detected components 113, utilization component 114 through relationship rules 115 determines the optimal solution to fulfil the current job request. For example, relationship rules 115 may have user defined rules that govern at least one of job requests and attached accelerators.

In an embodiment, accelerator component 111, through utilization component 114, determines which additional accelerators to use based on the current job. For example (referring to FIG. 1A), accelerator component 111 recalls (from step 302) that there are two accelerators attached to network 103 (i.e., machine learning accelerator 120 and SQL accelerator 140) along with machine learning server 130. Therefore, accelerator component 111 through utilization component 114 determines that machine learning accelerator 120 coupled with SQL accelerator 140 would be best suited for the current job request (i.e., machine learning request). Machine learning application 117 would query for SQL accelerators (e.g., SQL accelerator 140) that would apply to itself, an ML application (e.g., machine learning application 117, etc.), and then it would be provided a modified connection string to connect directly to the accelerator (e.g., SQL accelerator 140). Machine learning application 117 would deploy work to ML accelerator 120, but with the modified SQL connection string so that it connects directly to SQL accelerator 140. For example, accelerator component 111 can manage the activity of both accelerators (e.g., ML accelerator 120 and SQL accelerator 140) in order to maximize the speed and efficiency of machine learning server 130. Accelerator component 111 can instruct machine learning server through machine learning accelerator 130 to request data directly from the attached SQL accelerator 140 in order to minimize the time. It is noted that database 116 is the target of machine learning request in the current embodiment.

In another embodiment (referring to FIG. 1A), accelerator component 111 through utilization component 114 determines that utilizing only ML accelerator 120 would be best suited for the current job request (i.e., machine learning request for database 116). Accelerator component 111 can manage the activity of ML accelerator 120 in order to maximize the speed and efficiency of machine learning server to database 116.

In yet another embodiment (referring to FIG. 1B), accelerator component 111 through utilization component 114 determines that SQL accelerator 140 would be best suited for the current job request (i.e., web service request to database 116) from web application 119. After recalling the attached accelerators available from step 302 (via detected components 113), accelerator component through utilization component 114 determines that the most efficient and fastest path to fulfil the web service job request is to use the attached SQL accelerator 140 for database 116.

Accelerator component 111 determines whether to use accelerator components (decision block 306).

If accelerator component 111 determines not to use accelerator components ("NO" branch, decision block 306), then accelerator component 111 proceeds to use non-accelerated component (step 308). In an embodiment, accelerator component 111 proceeds to utilize the non-accelerate components. It is possible for accelerator component 111 to decide not to use accelerator components based on the result of the analysis by relationship rules 115. For example, after accelerator component 111 through relationship rules 115 analyzed the topography, job request and other parameters, accelerator component 111 may determine that that using non-accelerated instead of accelerated components offers the best result under the particular condition.

If accelerator component 111 determines to use accelerator components ("YES" branch, decision block 306), then accelerator component 111 proceeds to use accelerated component (step 310). In an embodiment, accelerator component 111 proceeds to utilize the accelerated components (e.g., ML accelerator 120 or SQL accelerator 140). For example, after accelerator component 111 analyzed the topography, job request and other parameters, accelerator component 111 may determine that that using accelerated components offer the best result under the given condition.

Figure 4:
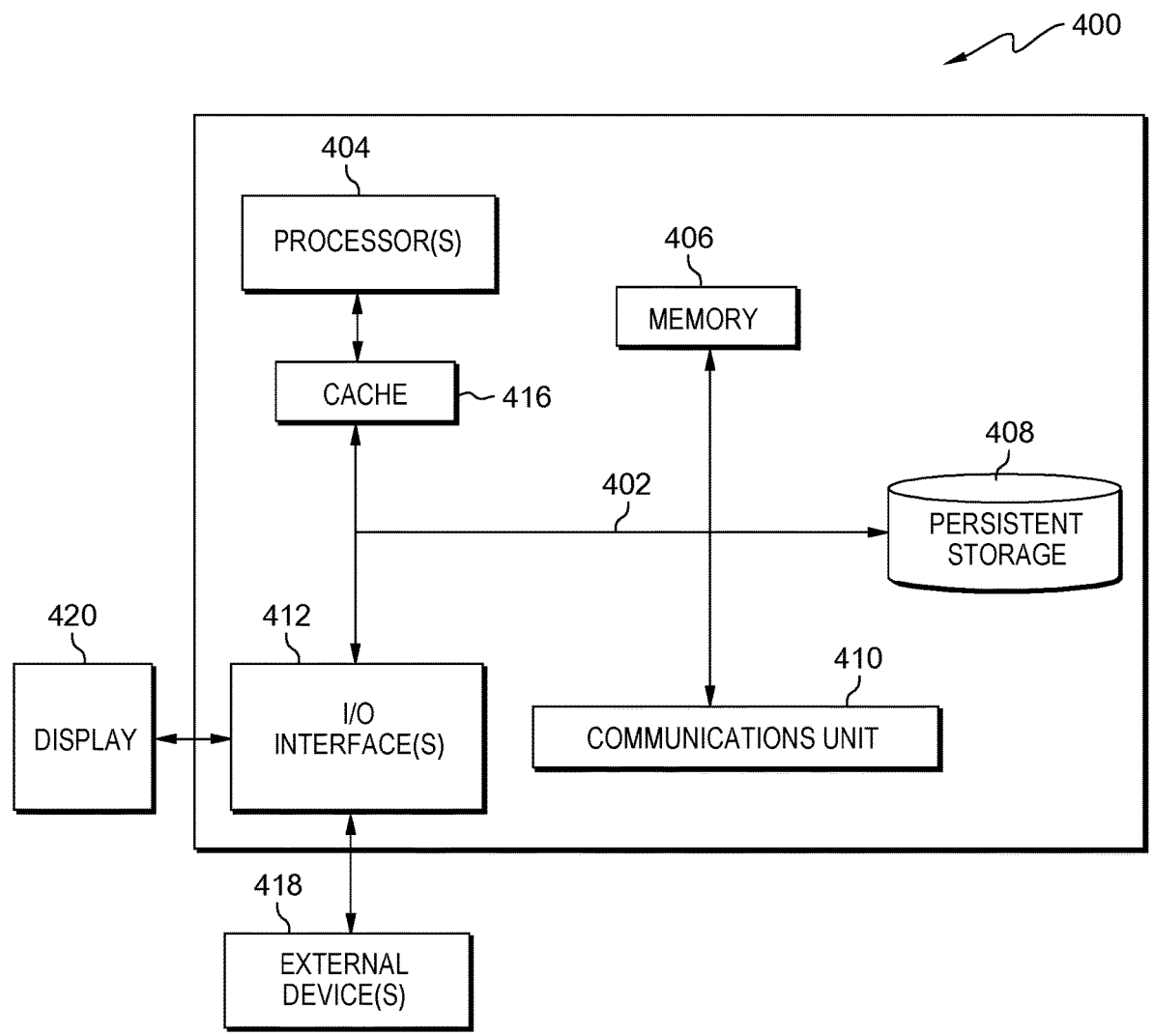
FIG. 4 depicts a block diagram, designated as 400, of components of the server computer executing the program within the host server, in accordance with an embodiment of the present invention.

FIG. 4 depicts a block diagram, designated as 400, of components of the server computer executing the program within the host server accelerator environment of FIG. 1A (or FIG. 1B), in accordance with an embodiment of the present invention.

Host server 110 can include processor(s) 404, cache 416, memory 406, persistent storage 408, communications unit 410, input/output (I/O) interface(s) 412 and communications fabric 402. Communications fabric 402 provides communications between cache 416, memory 406, persistent storage 408, communications unit 410, and input/output (I/O) interface(s) 412. Communications fabric 402 can be implemented with any architecture designed for passing data and/or control information between processors (such as microprocessors, communications and network processors, etc.), system memory, peripheral devices, and any other hardware components within a system. For example, communications fabric 402 can be implemented with one or more buses.

Memory 406 and persistent storage 408 are computer readable storage media. In this embodiment, memory 406 includes random access memory (RAM). In general, memory 406 can include any suitable volatile or non-volatile computer readable storage media. Cache 416 is a fast memory that enhances the performance of processor(s) 404 by holding recently accessed data, and data near recently accessed data, from memory 406.

Program instructions and data used to practice embodiments of the present invention, e.g., accelerator component 111 and database 116, can be stored in persistent storage 408 for execution and/or access by one or more of the respective processor(s) 404 of host server 110 via memory 406. In this embodiment, persistent storage 408 includes a magnetic hard disk drive. Alternatively, or in addition to a magnetic hard disk drive, persistent storage 408 can include a solid-state hard drive, a semiconductor storage device, a read-only memory (ROM), an erasable programmable read-only memory (EPROM), a flash memory, or any other computer readable storage media that is capable of storing program instructions or digital information.

The media used by persistent storage 408 may also be removable. For example, a removable hard drive may be used for persistent storage 408. Other examples include optical and magnetic disks, thumb drives, and smart cards that are inserted into a drive for transfer onto another computer readable storage medium that is also part of persistent storage 408.

Communications unit 410, in these examples, provides for communications with other data processing systems or devices, including resources of machine learning server 130. In these examples, communications unit 410 includes one or more network interface cards. Communications unit 410 may provide communications through the use of either or both physical and wireless communications links. Accelerator component 111 and database 116 may be downloaded to persistent storage 408 of host server 110 through communications unit 410.

I/O interface(s) 412 allows for input and output of data with other devices that may be connected to host server 110. For example, I/O interface(s) 412 may provide a connection to external device(s) 418 such as a keyboard, a keypad, a touch screen, a microphone, a digital camera, and/or some other suitable input device. External device(s) 418 can also include portable computer readable storage media such as, for example, thumb drives, portable optical or magnetic disks, and memory cards. Software and data used to practice embodiments of the present invention, e.g., accelerator component 111 and database 116 on host server 110, can be stored on such portable computer readable storage media and can be loaded onto persistent storage 408 via I/O interface(s) 412. I/O interface(s) 412 also connect to a display 420.

Display 420 provides a mechanism to display data to a user and may be, for example, a computer monitor or the lenses of a head mounted display. Display 420 can also function as a touchscreen, such as a display of a tablet computer.

The present invention may be a system, a method, and/or a computer program product. The computer program product may include a computer readable storage medium (or media) having computer readable program instructions thereon for causing a processor to carry out aspects of the present invention.

The computer readable storage medium can be any tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, a special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, a segment, or a portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

What is claimed is:

1. A method for optimizing a use of accelerators, the method comprising:
receiving, by one or more computer processors, a job request from an application, wherein the job request is associated with a machine learning request;
identifying, by the one or more computer processors, one or more accelerators on a network;
creating, by the one or more computer processors, a network mapping of the one or more accelerators based on a utilization component, wherein the one or more accelerators comprise a database accelerator, a web accelerator and a machine learning accelerator and the utilization component comprises user generated relationship rules based on pre-defined parameters associated with the one or more accelerators;
sending, by the one or more computer processors, a data request to a database server based on the job request by leveraging the database accelerator, wherein leveraging the database accelerator comprises:
submitting one or more data requests to the database accelerator, wherein the database accelerator is attached to the database server; and
receiving, by the one or more computer processors, data from the database accelerator and forwarding the data to the machine learning accelerator, wherein the machine learning accelerator completes the job request by processing the received data.

2. The method of claim 1, further comprising:
identifying, by the one or more computer processors, the one or more accelerators based on broadcasting a discoverable protocol; and
receiving, by the one or more computer processors, an acknowledgement response from the one or more accelerators.

3. The method of claim 1, wherein the relationship rules are dynamically adjusted by the user.

4. The method of claim 1, wherein the utilization component contains a calculating module associated with creating the network mapping.

5. The method of claim 1, wherein the network mapping further comprises an IP address, an SQL query instruction, and API code.

6. A computer program product for optimizing the use of accelerators, the computer program product comprising:
one or more computer readable storage devices and program instructions stored on the one or more computer readable storage devices, the stored program instructions comprising:
program instructions to receive a job request from an application, wherein the job request is associated with a machine learning request;
program instructions to identify one or more accelerators on a network;
program instructions to create a network mapping of the one or more accelerators based on a utilization component, wherein the one or more accelerators comprise a database accelerator, a web accelerator and a machine learning accelerator and the utilization component comprises user generated relationship rules based on pre-defined parameters associated with the one or more accelerators;
program instructions to send a data request to a database server based on the job request by leveraging the database accelerator, wherein leveraging the database accelerator comprises:
submitting one or more data requests to the database accelerator, wherein the database accelerator is attached to the database server; and
program instructions to receive data from the database accelerator and forward the data to the machine learning accelerator, wherein the machine learning accelerator completes the job request by processing the received data.

7. The computer program product of claim 6, the stored program instructions further comprising:
program instructions to identify the one or more accelerators based on broadcasting a discoverable protocol; and
program instructions to receive an acknowledgement response from the one or more accelerators.

8. The computer program product of claim 6, wherein the relationship rules are dynamically adjusted by the user.

9. The computer program product of claim 6, wherein the utilization component contains a calculating module associated with creating the network mapping.

10. The computer program product of claim 6, wherein the network mapping further comprises an IP address, an SQL query instruction, and API code.

11. A computer system for optimizing the use of accelerators, the computer system comprising:
one or more computer processors;
one or more computer readable storage devices; and
program instructions stored on the one or more computer readable storage devices for execution by at least one of the one or more computer processors, the stored program instructions comprising:
program instructions to receive a job request from an application, wherein the job request is associated with a machine learning request;
program instructions to identify one or more accelerators on a network;
program instructions to create a network mapping of the one or more accelerators based on a utilization component, wherein the one or more accelerators comprise a database accelerator, a web accelerator and a machine learning accelerator and the utilization component comprises user generated relationship rules based on pre-defined parameters associated with the one or more accelerators;
program instructions to send a data request to a database server based on the job request by leveraging the database accelerator, wherein leveraging the database accelerator comprises:
submitting one or more data requests to the database accelerator, wherein the database accelerator is attached to the database server; and
program instructions to receive data from the database accelerator and forward the data to the machine learning accelerator, wherein the machine learning accelerator completes the job request by processing the received data.

12. The computer system of claim 11, the stored program instructions further comprising:
program instructions to identify the one or more accelerators based on broadcasting a discoverable protocol; and
program instructions to receive an acknowledgement response from the one or more accelerators.

13. The computer system of claim 11, wherein the relationship rules are dynamically adjusted by the user.

14. The computer system of claim 11, wherein the utilization component contains a calculating module associated with creating the network mapping.

15. The computer system of claim 11, wherein the network mapping further comprises an IP address, an SQL query instruction, and API code.

16. The computer system of claim 11, wherein leveraging the database accelerator comprises:
program instructions to submit one or more data request to the database accelerator, wherein the database accelerator is attached to the database server.

* * * * *